March 18, 1969     A. J. DETRIXHE     3,433,706

ROTARY PLOW

Filed May 16, 1966

INVENTOR
Arvid J. Detrixhe

BY Hovey, Schmidt, Johnson & Hovey
ATTORNEYS.

United States Patent Office 3,433,706
Patented Mar. 18, 1969

3,433,706
ROTARY PLOW
Arvid J. Detrixhe, R.R. 2, Ames, Kans. 66931
Filed May 16, 1966, Ser. No. 550,377
U.S. Cl. 172—67                          6 Claims
Int. Cl. A01b 9/00, 49/02, 35/28

ABSTRACT OF THE DISCLOSURE

A rotary plow having a rotatably driven rotor carried by a mobile frame, the rotor including a plurality of horizontally spaced discs, there being a plurality of L-shaped dirt receiving blades swingably mounted on the rotor by means extending between said discs, the blades, upon operation of the plow, lifting the dirt, carrying it upwardly and depositing it back on the ground in an inverted position as the rotor rotates and the frame advances.

---

This invention relates to a plow structure and has as its primary object the provision of a rotor for continuously receiving dirt and turning the same over to deposit the dirt in an inverted position on the ground. By inverting the dirt, the ground is prepared for cultivation and the top soil and organic matter, such as plants, stubble, and the like, are buried and ultimately enrich the soil.

It is an important object of this invention to provide a plow of the aforementioned character wherein a plurality of revolving, continuous blades are utilized to carry and deposit the dirt in the desired inverted manner. The blades carry the dirt over the top of the rotor and deposit the same by gravitation which is in contrast to prior throwing or mixing operations which could not efficiently bury the organic material.

Figures 1, 2, 3, 4:
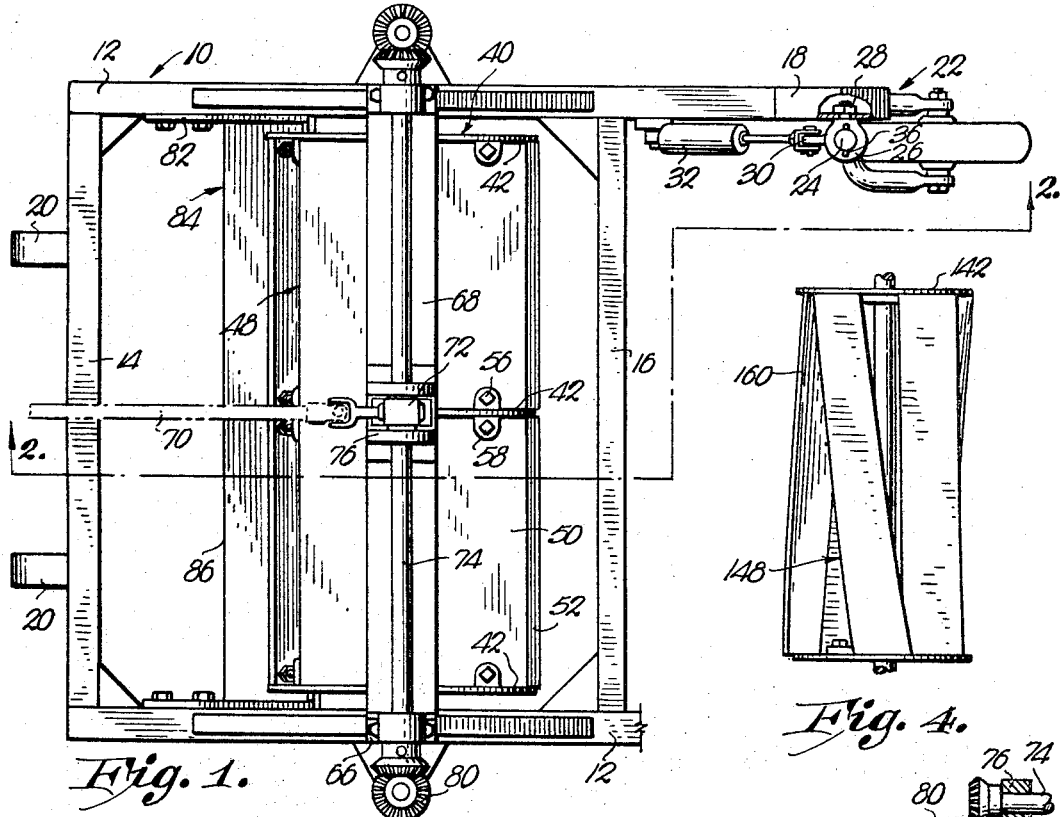
FIGURE 1 is a fragmentary, plan view of a rotary plow made pursuant to the teachings of my invention.
FIG. 2 is a cross-sectional view taken along line 2—2 of FIG. 1.
FIG. 3 is a fragmentary, cross-sectional view taken along line 3—3 of FIG. 2.
FIG. 4 is a fragmentary, reduced plan view of a spiral-type rotor for the plow.

In the embodiment of the invention shown in FIGS. 1–3, there is provided a frame 10 having parallel side members 12 interconnected by a front channel 14 and a rear channel 16. Each side member 12 extends rearwardly of channel 16 and is inclined upwardly to define a wheel support 18. Hitching means 20 is provided on front channel 14 and is adapted for connection to a suitable towing medium (not shown).

Each support 18 carries a caster wheel assembly 22 which includes a shank 24 telescoped through a corresponding sleeve 26. Only one support 18 and assembly 22 are shown in the drawing. It should be understood that the support and wheel assembly for the other side member 12 are identical to support 18 and assembly 22 respectively. Each sleeve 26 is swingably mounted on a respective sleeve support 18 by bolt and nut means 28 (FIG. 1), and has a crank 30 extending forwardly for connection to hydraulic cylinder 32 which is anchored to side member 12.

Shank 24 has a plurality of vertically spaced apertures 34 with a pair of cotter keys 36 extending through corresponding apertures above and below sleeve 26 to maintain the shank in position. Wheel assembly 22 may thus be vertically adjusted by removing and shifting the positions of cotter keys 36.

A rotor, broadly designated by the numeral 40, is mounted on frame 10 for rotation about an axis normal to the direction of advancement of the frame. In the form of the invention chosen for illustration, rotor 40 includes three equally spaced discs 42 interconnected by a transversely extending rotor shaft 44 mounted for rotation between side members 12.

Three rods 46 extend parallel to shaft 44 between each pair of adjacent discs 42, each rod swingably mounting a longitudinally extending, L-shaped blade or receiver section 48. Each blade section 48 includes a radial leg portion 50 extending outwardly from rod 46, and a cutting leg portion 52 extending from the outermost end of radial leg 50 in the direction of rotation of rotor 40 as indicated by the arrows in FIG. 2. The inner end of each radial leg 50 is provided with a pair of collars 54 adjacent corresponding discs 42, with a respective rod 46 extending through the collars to swingably mount a blade section 48. It will be readily recognized by those skilled in the art that any suitable number of circumferentially spaced blades 48 could be provided in the construction of rotor 40.

Blade sections 48 may be maintained in position by a tight fit between corresponding discs 42, adjustment of the blades being effected by bolts 56 mounted on discs 42 by threaded brackets 58 engaging the rear face of a corresponding radial leg 50 to hold the same against counter-rotation. Cutting legs 52 extend generally tangentially of the outer arc of rotation of rotor 40 and terminate in bevelled cutting edges 60. A relatively flexible facing material, such as commonly available belting material 62, may be secured to the inner leading face 64 of each blade section 48 if desired. The blade sections 48 between each pair of adjacent discs 42 present side-by-side banks which are aligned to form three continuous linear blades extending entirely across rotor 40 between the outer discs 42.

A pair of upstanding supports 66 are provided on side members 12 and are interconnected by a channel cross member 68 spaced above rotor 40. A drive shaft 70 is coupled to the towing medium and extends rearwardly for meshing within a gearbox 72 with laterally extending jackshafts 74 which are mounted for rotation above cross member 68 by bearing mounts 76.

Each support 66 rotatably carries a vertical stub shaft 78 (FIG. 3) which is meshed at its opposed ends with a corresponding jackshaft 74 and the proximal end of rotor shaft 44 by means of bevel gears 80. As will be appreciated, rotation of drive shaft 70 causes rotation of jackshafts 74 through gearbox 72, the jackshafts operating through stub shafts 78 to rotate rotor shaft 44. Turning of rotor shaft 44 causes rotation of discs 42 and thereby blade sections 48 in the direction of the arrows in FIG. 2.

A pair of brackets 82 extend downwardly from side members 12 and are interconnected at their lower ends by a cutter plate 84. Plate 84 has a bevelled leading edge 86 and is inclined upwardly toward rotor 40 and termintes adjacent the revolving blade sections 48. Brackets 82 are mounted by slot adjustment structure to permit varying of the position of plate 84.

In operation, frame 10 is towed by a tractor or the like over the ground 88. Wheel assembly 22 is vertically adjusted whereby leading edge 86 of plate 84 is positioned below ground 88 to cut dirt therefrom. Drive shaft 70 is operated to rotate jackshafts 74, stub shafts 78, rotor shaft 44 and rotor 40, the latter rotating with the underpassing arc thereof in the direction of advancement of frame 10 as indicated by the arrows in FIG. 2.

As frame 10 advances, the dirt is urged along the inclined upper face of plate 84 for delivery to the pockets 90 forward of the leading faces 64 of revolving blade sections 48 and the corresponding belt surfaces 62. Blade sections 48 lift the dirt upwardly and then carry the same over the axis of rotor 40 for deposit by gravitation back on ground 88 in an inverted position. The dirt does not adhere to blade sections 48 because of the flexible character of the belting surface 62. Since blade sections 48 form a substantially continuous, longitudinal member, no dirt is lost between aligned blade sections 48.

Upon deposit, the organic material initially covering ground 88 is buried, whereupon it ultimately decomposes to enrich the soil. The carrying and depositing action of rotor 40 to plow and invert the soil is in contrast to other rotary devices which usually mix or throw the dirt, and thus do not efficiently cover the top soil and organic material. The present invention effects a plowing action similar to that of a conventional moldboard plow and has accomplished this by using a novel, continuous rotary structure.

If desired, leg portions 52 of blade sections 48 may serve as the primary cutter means by removing cutter plate 84 and lowering frame 10 so that cutting edges 60 will sequentially enter ground 88 to sever the soil as they are rotated. Blade sections 48 thereby cut the dirt and deliver the same to pockets 90 whereby the dirt is lifted upwardly and ultimately deposited by gravitation as described above. The tangential angle of cutting leg 52 may be varied by turning bolts 56 to shift corresponding blade sections 48 into the desired positions. If a bolt 56 is drawn away from a corresponding blade section 48, the first entrance of the blade into ground 88 will shift the blade into contact with bolt 56 to thereby effect adjustment thereof. The tight fit between adjacent discs 42 precludes swinging of the blade sections 48 when they are rotating downwardly.

When the present invention is plowing a number of side-by-side rows in a field, the caster wheel assembly 22 adjacent to the immediately preceding plowed row is preferably swung upwardly about bolt and nut means 28 by operation of hydraulic cylinder 32 into the dashed line position shown in FIG. 2. Sufficient support is provided by one wheel assembly 22 for mobility of frame 10. By shifting the wheel assembly in this manner, the immediately preceding plowed row will not have a track formed therein by the caster wheel.

An alternate form of a rotor is shown in FIG. 4 and includes a pair of opposed discs 142 having blades 148 fitted therebetween. Blades 148 have a longitudinally spiral configuration and are transversely L-shaped in the same manner as the above-described embodiment to thereby define cutting edges 160. With the spiral arrangement, each cutting edge 160 enters the ground in a continuously increasing amount as the rotor turns and thus, smoother operation results. This is in contrast to the first described embodiment in which the cutting edges 60 intermittently entered the ground with consequent rougher action. Such rough action is held to a minimum, however, with use of cutting blade 84 to perform the primary ground-severing function. Blades 148 could, of course, also be adjustably mounted and have relatively flexible facing material thereon to enhance the operation.

Having thus described the invention, what is claimed as new and desired to be secured by Letters Patent is:

1. A plow comprising:
   a mobile frame;
   a rotor including a plurality of horizontally spaced discs;
   means mounting the rotor on the frame for rotation about an axis normal to the direction of advancement of the frame;
   means coupled with said rotor for rotating the same with the underpassing arc of rotation thereof in said direction of advancement,
   said rotor having a number of dirt receivers disposed to lift the dirt received thereby upwardly and then carry the dirt over said axis for deposit by gravitation back on the ground in an inverted position, said receivers each comprising a longitudinally extending blade, each blade being L-shaped to present a pair of legs, one leg extending radially of the rotor, the other leg extending from the outer end of said one leg in the direction of rotation;
   means extending between said discs inwardly thereof, said means having one end of said radially extending legs swingably mounted thereon; and
   means for cutting and delivering the dirt to the receivers.

2. The invention of claim 1, there being adjustment means for each blade on the rotor for positioning the same in any one of a number of positions to vary the angle of the blade.

3. The invention of claim 2, said blades being continuous longitudinally of the rotor.

4. The invention of claim 3, said blades having a longitudinal spiral configuration.

5. The invention of claim 1, said cutting means comprising a cutter plate mounted on said frame forwardly of said rotor and parallel thereto, the leading edge of said plate being positioned to cut dirt from the ground therebelow as said frame advances, the cutter being inclined upwardly toward the rotor and adjacent the revolving receivers for delivering the cut dirt therein.

6. The invention of claim 1, said receivers each having a flexible facing material thereon to minimize adhering of the dirt thereto.

References Cited
UNITED STATES PATENTS

| | | | |
|---|---|---|---|
| 1,318,920 | 10/1919 | Reed | 172—122 |
| 1,328,800 | 1/1920 | Sherrod | 172—550 |
| 2,887,168 | 5/1959 | Owen | 172—67 |
| 2,920,586 | 1/1960 | Negreira | 172—65 |
| 3,181,622 | 5/1965 | Adams et al. | 172—519 |

ROBERT E. BAGWILL, *Primary Examiner.*

U.S. Cl. X.R.

172—119